O. B. & E. D. REYNOLDS.
Seed Planter.
No. 49,302.
Patented Aug. 8, 1865.
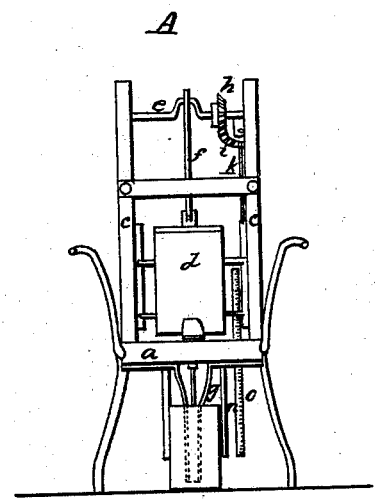
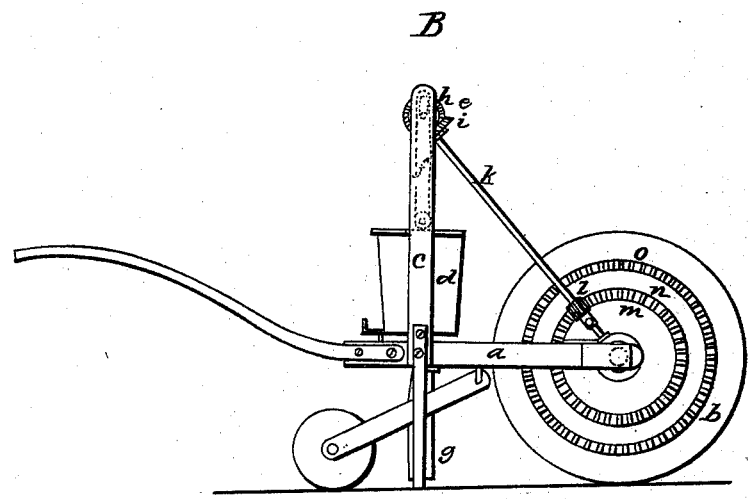
Witnesses:
Francis Gould
S. B. Reader
Inventor:
O. B. & E. D. Reynolds
by his Atty
W. B. Crosby

United States Patent Office.

E. D. REYNOLDS AND O. B. REYNOLDS, OF NORTH BRIDGEWATER, MASS.

IMPROVEMENT IN SEEDING-MACHINES.

Specification forming part of Letters Patent No. 49,302, dated August 8, 1865.

*To all whom it may concern:*

Be it known that we, E. D. REYNOLDS and O. B. REYNOLDS, of North Bridgewater, in the county of Plymouth and State of Massachusetts, have invented an Improved Seed-Sower; and we do hereby declare that the following, taken in connection with the drawings which accompany and form part of this specification, is a description of our invention sufficient to enable those skilled in the art to practice it.

In the construction of large seed-drill carriages the custom is generally to make provision for depositing the seed in the spouts or conductors through which it falls to the ground, by the action of a hollow rotary cylinder containing the seed and pierced with holes of such size and distance apart as to regulate the quantity of seed sown. In drill barrows or sowers propelled by hand a rotary brush is used for sweeping the seed at regular intervals through gaged openings in the gate of the seed-box.

Our invention has for its object the simplification of the construction of seed-sowers, by which revolving cylinders and brushes are dispensed with, and the seed more evenly and effectively sown.

The improvement consists in so mounting the seed-box as that it shall have imparted to it by the rotation of the barrow-wheel a reciprocating vertical motion, such reciprocation or the jarring of the box produced thereby impelling the seed through the opening in the gate at the bottom of the box at each downward movement thereof.

A hand or barrow seed-sower embodying the invention is shown in the drawings, A representing a front elevation, and B a side elevation, of the same.

*a* denotes the frame, supported at its front end on a wheel, *b*, and having two uprights, *c*, between which the seed-box *d* is hung from a crank-shaft, *e*, by means of a link, *f*. Rotation of this shaft imparts a vertical up-and-down movement to the box, and in these movements it is guided or kept from swinging by means of way pieces or guides on the uprights and lateral projections from the box sliding over such way-pieces.

The bottom of the box is furnished with a spout, by which the seed is led into the seed-conductor or colter *g*, the entrance into said spout from the seed-box being controlled by gates or slides in any suitable manner. The crank-shaft is driven by means of a bevel-wheel, *h*, on the shaft meshing into a bevel-wheel, *i*, on a shaft, *k*, which carries a pinion, *l*, driven by a face-gear, *m*, on a disk-wheel, *n*, mounted on the shaft of the wheel *b*, so that the propulsion of the sower rotates the crank *e* and imparts vertical reciprocations to the seed-box.

The disk *n* is furnished with a second face-gear, *o*, and the pinion *l* is fastened upon the shaft *k*, so that it may be carried into engagement with either one of the face-gears, as it may be desirable to drive the seed-box slow or fast relatively to the rate of progress of the sower, as will be readily understood. The reciprocation of the box causes the seed to drop from it at each successive rotation of the crank in even quantities regulated by the size of the opening in the slide, and no brush or other mechanism connected directly with the seed delivery is necessary.

With a sower operating by a brush to effect and control the delivery of the seed the holes in the gate or slide are constantly becoming obstructed, preventing or impairing the proper delivery of the seed, and this is also the case with rotary seed-holders, but by giving the box the reciprocal motion, as set forth, the deposit of seed is rendered certain and effective.

We claim—

A seed-sower, having a reciprocating seed-box, operating in the manner and for the purpose substantially as set forth.

In witness whereof we have hereto set our hands this 1st day of July, A. D. 1865.

EDMUND D. REYNOLDS.
  O. BRADFORD REYNOLDS.

Witnesses:
 GEO. W. BRYANT,
 TIMOTHY DESMOND.